April 8, 1958  W. B. NOLAND  2,829,390
PORTABLE LOADING DOCK PLATES
Filed Jan. 18, 1954 3 Sheets-Sheet 2
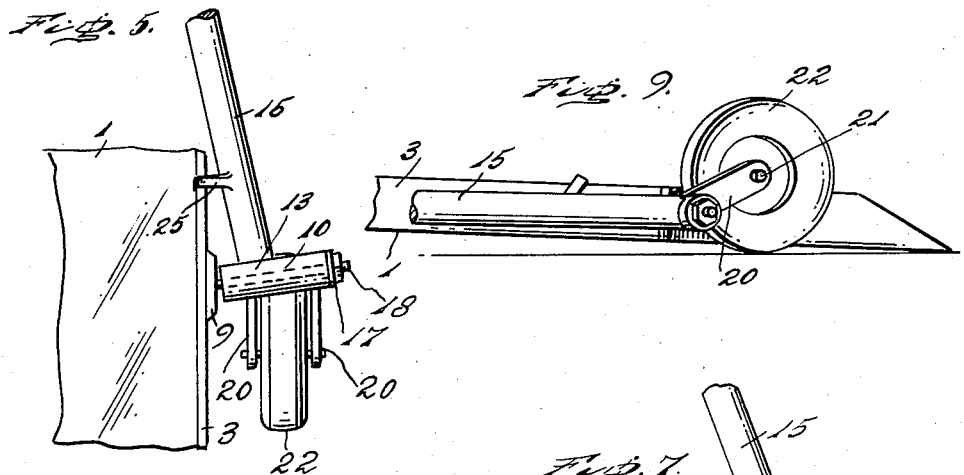
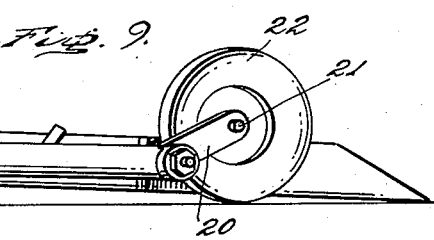
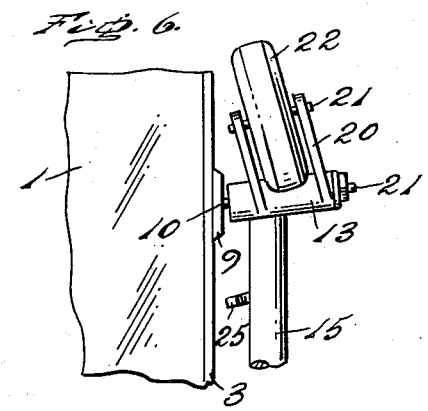
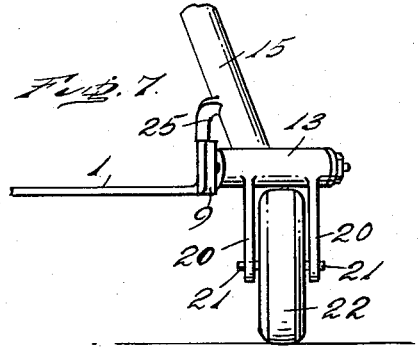
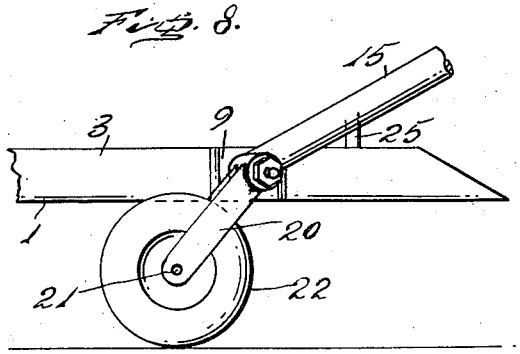
Inventor
Wayne B. Noland
By Attorney April 8, 1958 W. B. NOLAND 2,829,390
PORTABLE LOADING DOCK PLATES
Filed Jan. 18, 1954 3 Sheets-Sheet 3
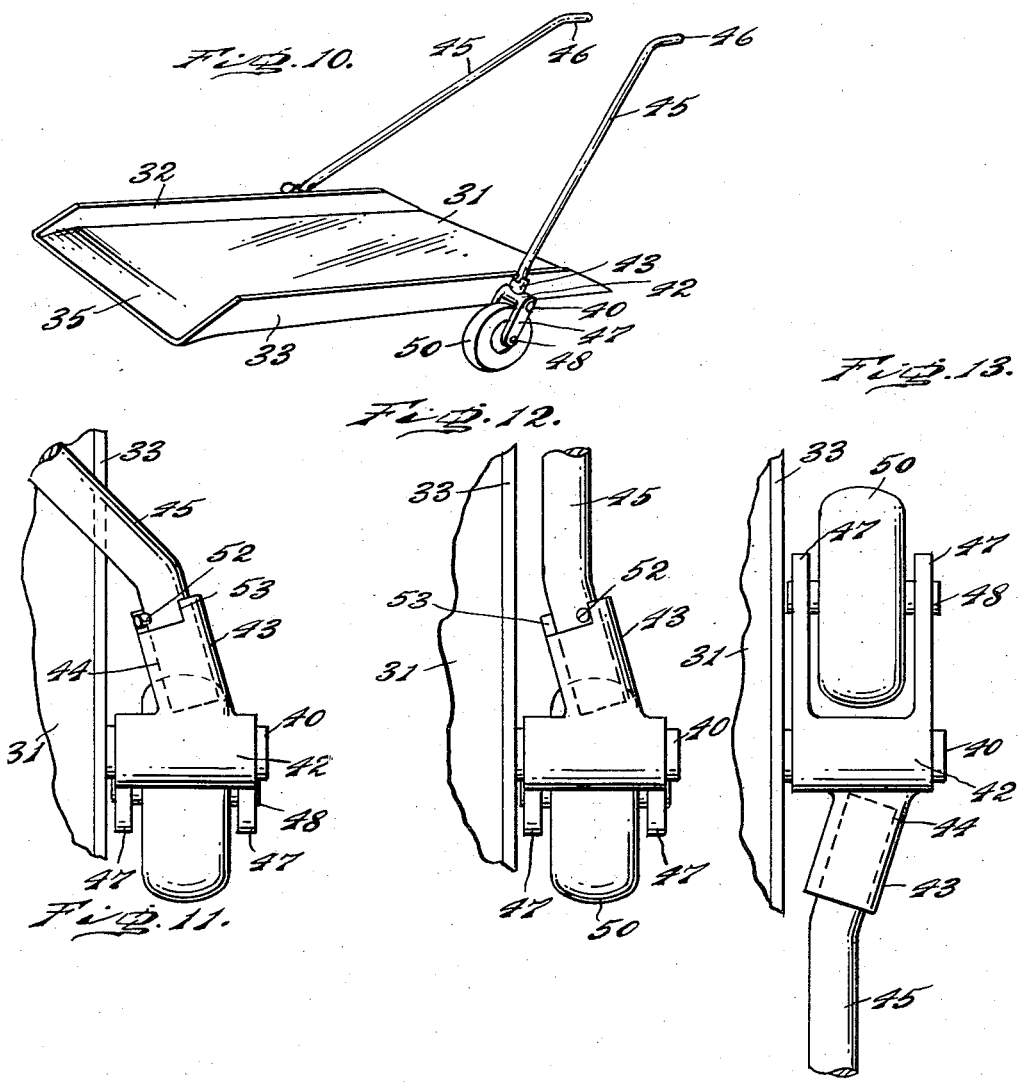

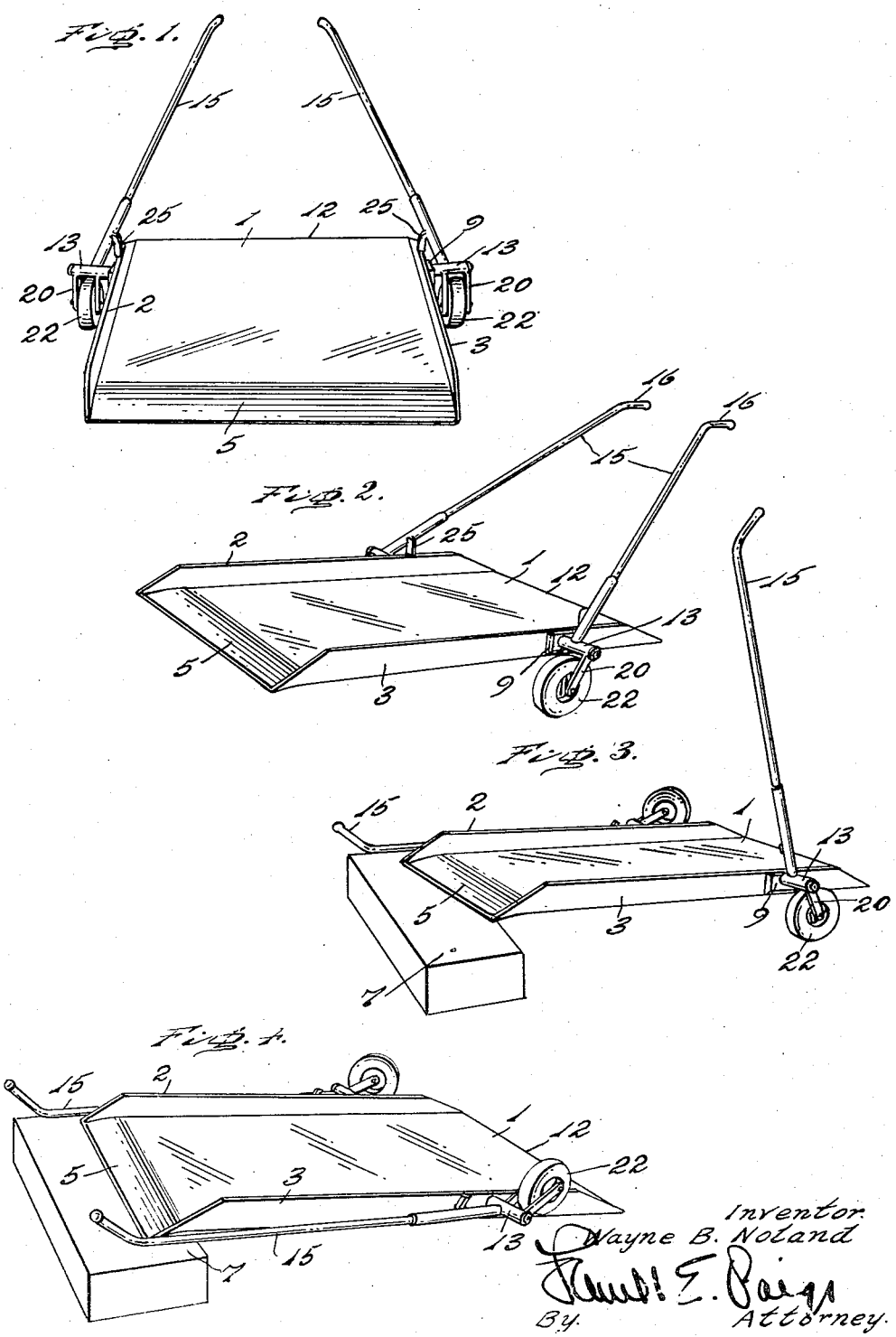

United States Patent Office 2,829,390
Patented Apr. 8, 1958

2,829,390

PORTABLE LOADING DOCK PLATES

Wayne B. Noland, Avon Lake, Iowa, assignor to Woodford Hydrant Company, Des Moines, Iowa, a corporation of Iowa Application January 18, 1954, Serial No. 404,449

3 Claims. (Cl. 14—72)

My invention relates to improvement in portable loading dock plates. Loading dock plates are used principally for bridging the gap, or space, between loading docks, or platforms, and the floors of automobile trucks, freight cars, etc. when trucks, freight cars, etc. are positioned closely adjacent to the loading docks. Among other uses, loading dock plates also are used as a ramp between different levels of a floor in a building to enable lift trucks, hand trucks, etc. to be used to effect the transfer of goods from one place to another.

Loading docks, platforms, floors of trucks and freight cars, etc. are not of uniform heigth, and it is common practice to use an ordinary steel plate as a bridging means between the loading docks and the floors of trucks, etc. to facilitate the transfer of goods from one location to the other. Even if by coincidence the loading dock and the floor of the truck or freight car should be in the same plane, a loading dock plate is necessary because it is practically impossible to position the floor of the truck or freight car in contacting relation with the loading platform.

Loading dock plates made of ordinary steel plate are particularly difficult to handle because of their weight, which must be very substantial in order that the steel plate be of sufficient strength to support the weight of loaded gasoline-powered lift trucks which are quite commonly used for transferring goods from automobile trucks etc. to loading docks, and vice versa. Loading dock plates usually are relatively wide in order to accommodate the full tread width of a lift truck which, when fully loaded, may weigh four or five tons. A size of commonly used loading dock plate made of ⅜" steel plate will weigh between 400 and 500 pounds.

Such steel dock plates ordinarily include no means to facilitate the handling of the dock plate except, perhaps, a chain fastened at the corner to enable the plate to be dragged. Accidents, such as smashed fingers or worse, frequently result when freight handlers move these steel plates into or out of the desired location, for example, by lifting up one side thereof by means of the projecting support base of a hand truck, etc. More recently, there has been some use made of magnesium plate for loading dock plates, in lieu of steel plate, in order to effect a decrease in the amount of the weight of the dock plate handled by the freight handlers. However, magnesium dock plates of sufficient tensile strength cost several hundred dollars each, which has been a detriment to the wider use of magnesium plate to replace steel plate.

Many attempts have been made in the past to develop some practical means by which a loading dock plate could be handled more facilely, but none has received any substantial commercial acceptance for one reason or another. For example, hydraulically-powered means have been used for raising and lowering a steel dock plate carried on wheels; another form includes the provision of rollable means which may be disengaged from steel plate; another form includes a single straight parallel handle mounted at one side of the plate, for movement in a plane parallel with the side of the plate, and adapted to raise or lower wheels in a plane parallel with the side of the plate, the wheels being mounted on a cross shaft beneath the plate, which necessitates the plate having an undesirable hump in its surface; etc. and etc.

One of the objects of my invention is to provide a loading dock plate which one man may facilely and properly handle, control, and position.

Another object of my invention is to provide a loading dock plate with a pair of handles which, when moved from non-use position to a position of use for moving the plate, will move toward each other until at the point of lifting engagement with the plate, they will be spaced apart only the distance as will most advantageously enable an ordinary man to utilize his strength to facilely raise, move, and position the plate, and with the supporting wheels moved to a position in which the wheels are parallel with the sides of the plate.

Another object of my invention is to provide a loading dock plate with a pair of handles which, when in position of non-use, will be positioned in close substantially parallel position with respect to the side edges of the plate, and at the same time move the plate supporting wheels out of contact with the floor to permit the plate to rest firmly and securely hereon.

My invention includes the various novel features of construction and arrangement as hereinafter specified, with reference to the accompanying drawings.

Fig. 1 is a front perspective view of a portable loading dock plate embodying my invention.

Fig. 2 is a perspective side view of the structure shown in Fig. 1.

Fig. 3 is a perspective side view of the structure as shown in Fig. 2, with the loading dock plate bridging two levels of different heighths, and with one of the handles moved to position of non-use, and with the other handle partly moved to position of non-use.

Fig. 4 is a perspective side view of the structure shown in Fig. 3, but with both handles shown in position of non-use.

Fig. 5 is an enlarged fragmentary plan view showing one of the wheels in parallel relationship with the side of the loading dock plate when the handle is in the position as shown in Fig. 1.

Fig. 6 is an enlarged fragmentary plan view showing the position of one of the wheels and a fragmentary portion of the handle, when the handle is in the position as shown in Fig. 4.

Fig. 7 is an enlarged fragmentary front elevation showing one of the wheels and a fragmentary portion of the handle, when the handle is in the position as shown in Fig. 1.

Fig. 8 is an enlarged fragmentary side elevation of the structure shown in Fig. 7.

Fig. 9 is an enlarged fragmentary side elevation showing one of the wheels and a fragmentary portion of the handle, when the handle is in the position as shown in Fig. 4.

Fig. 10 is a perspective side view of a modified form of my invention.

Fig. 11 is an enlarged fragmentary plan view of the structure shown in Fig. 10 showing the position of the wheel and handle with respect to the side flange of the loading dock plate when the handle is in the position as shown in Fig. 10.

Fig. 12 is an enlarged fragmentary plan view, similar to Fig. 11, but with the handle turned in its socket to a position parallel with the side flange of the dock plate.

Fig. 13 is an enlarged fragmentary plan view showing the position of one of the wheels and a fragmentary portion of a handle of the structure shown in Fig. 10 when the handle is in a position of non-use.

Referring to the form of my invention shown in Figs. 1 to 9 inclusive; my improved portable loading dock plate includes the plate member 1 which is formed of any material having the desired tensile strength, such as ordinary steel plate. As a matter of choice, the respective side edges of the plate may be upturned to form respective side flanges 2 and 3. Of course, side flanges if desired may be formed as separate members, and secured to the plate 1 by any convenient means, such as by welding.

As indicated at 5, I find it convenient to bend downwardly the forward portion of the plate 1 to form a portion of the plate 1 which will be more nearly in the same plane as a higher level, such as indicated at 7 in Figs. 3 and 4, when the dock plate is intended for use in bridging between a lower and higher level. The downwardly turned portion 5 enables the dock plate to be more securely positioned, as, otherwise, if the plate 1 were a plane section of steel plate, the forward edge thereof would project into the air to a degree depending upon the point of contact on the plate 1 with the higher level. If desired, the downwardly bent portion 5 may be formed as a separate piece and welded at the desired angle to the front edge of the body of the plate 1.

The sides 2 and 3 of the plate 1 are provided conveniently with respective pads or brackets 9, in each of which is rigidly mounted an axle shaft or spindle 10. Of course, if the plate 1 does not include side flanges such as indicated at 2 and 3, brackets can be secured directly to the plane plate 1 in any of the well known ways well within the skill of an ordinary mechanic.

The axle shaft 10 is rigidly positioned in the pad or bracket 9 at an angle of approximately 10 or 12 degrees toward the rear of the plate, indicated by the reference mark 12.

A bearing member 13, rigidly or integrally connected to the end of each of the handle members 15, is provided with an axial opening therethrough, and mounted on its respective axle shaft 10, with freedom of turning movement. The handle members 15 conveniently are provided at their outer ends with bent portions 16 to form hand grips for the handles 15.

The bearing members 13 are prevented from axial displacement on their respective axle shafts 10 by any convenient means, such as by nuts 17 in screw threaded engagement with the outer screw threaded end 18 of the axle shaft 10.

It would be obvious to anyone of ordinary mechanical skill that, if desired, the same rotational movement of a handle 15 could be effected if the axle shaft were integral with the bearing member 13, and with the inwardly projecting end of the shaft mounted in a bearing opening formed angularly in a pad or bracket connected to the side of the plate 1.

Each of the bearing members 13 is provided with a pair of arms 20 rigidly or integrally connected to the bearing member 13. The arms 20 are provided with aligned openings therethrough at their outer ends to form bearings for the opposite ends of shafts 21 on which support wheels 22 are mounted with freedom of rotation. As best shown in Fig. 6, the arms 20 are angularly positioned with respect to the axis of the bearing member 13, so that the axis of the aligned bearing openings and of the shaft 21 will converge with the axis of its bearing member 13 in a direction toward the plate 1. Of course, the shaft 21 may be rigidly mounted in the arms 20, and the wheel 22 mounted with freedom of turning movement on its shaft 21.

Each of the handles 15 is provided with a rigid or integrally formed stop lug 25 which is adapted to engage the upwardly turned edge of the respective side flanges 2 and 3 to stop further movement of the handles 15 when in position of use for moving the dock plate, as shown in Figs. 1, 2, 5, 7, and 8. Pressure exerted by the operator by pushing downwardly on the hand grip portion 16 of the handles 15 will cause the forward edge 5 of the dock plate to be lifted free of contact with the floor, and the dock plate may be moved about freely on the wheels 22, with the dock plate maintained in counterbalanced position entirely free of contact with the floor.

Referring to the modified form of my invention shown in Figs. 10 to 13 inclusive; the portable loading dock plate includes the plate member 31, similar to the plate member 1, which has, as a matter of choice, respective upturned side flanges 32 and 33 and a downwardly bent forward portion 35.

The sides 32 and 33 are provided with respective axle shafts or spindles 40 rigidly mounted in their respective side flanges, and at right angles thereto. A bearing member 42 is mounted with freedom of turning movement on each of the shafts 40, and the bearing members 42 are prevented from axial displacement by any convenient means. Each of the bearing members 42 is provided with a socket extension portion 43 which has a socket opening 44 therein adapted to receive the bent inner end of a handle member 45 which, conveniently, are provided at their outer ends with bent portions 46 to form hand grips for the handles 45.

Each of the bearing members 42 is provided with a pair of arms 47, similar to the arms 20, and said arms 47 are provided with aligned openings therethrough to form bearings for the opposite ends of shafts 48 on which support wheels 50 are mounted with freedom of rotation.

As best shown in Figs. 11 and 12; the bent portion of the inner end of the handles 45 is provided with a stop pin 52 which is adapted to engage, selectively, the opposite sides of the cut out portion 53 formed at the top of the socket members 43 to limit the rotational movement of the handles 45 in their respective socket openings 44 formed in said socket members 43. The handle members 45 are prevented from axial displacement, but with freedom of rotational movement, in their sockets by any of the numerous well known means.

*Operation*

Assuming that my improved loading dock plate of the form shown in Figs. 1 to 9 is in the position as shown in Fig. 4, or on a floor, and the dock plate is to be moved to a different location; the operator lifts up one handle 15 with attached bearing member 13 and wheel 22, and rotates the handle, etc. clockwise on its axle shaft 10. At the bearing member 13 rotates about its angularly inclined axle shaft 10, the handle 15 moves in an angular plane toward the rear and center line of the plate 1, and the wheel 22 comes in contact with the floor and effects lifting movement of one side of the loading dock plate. Rotation of the handle 15 is continued until further movement is stopped by the stop lug 25 coming in contact with the upturned flange.

The operator then moves the other handle 15 in the same manner, which brings the other wheel 22 in contact with the floor and lifts the rearward portion of the dock plate entirely free of the floor, with the outer hand grip ends 16 of the handles 15 in closer relationship as shown in Fig. 1, and with the weight of the plate supported on the two wheels 22. The operator then pushes down on the hand grip portions 16 of the handles 15, which will cause the forward edge 5 of the dock plate to also be lifted free of contact with the floor, and the dock plate can be moved about freely on the wheels 22, with the dock plate maintained in counterbalanced position entirely free of contact with the floor.

When the dock plate is positioned in the desired location, the operator then moves one handle 15 in the reverse, or counterclockwise direction, which moves the wheel 22 free of supporting contact with the floor, and that side of the dock plate comes in contact with the floor, with the handle 15 in a position substantially parallel with the side of the dock plate, as shown in Figs. 4 and 6. The operator then moves the other handle 15 in the same manner, which permits the dock plate to be firmly positioned in the desired location.

Referring to the modified form of my invention shown in Figs. 10 to 13 inclusive; assuming that the handles of the dock plate are in the use position as shown in Fig. 10, the operator turns the handles 45 outwardly in their respective socket openings 44, and from the position shown in Fig. 11 to the position shown in Fig. 12. The stop pins 52 will come into engagement with the opposite side of the cut out portions 53 and prevent the handles 45 from being turned further when they have reached a position substantially parallel with their respective side flanges of the dock plate. The handles 45, bearing members 42, and support wheels 50, are then rotated as a unit about their axle shafts 40, and from the position shown in Fig. 12 to the position shown in Fig. 13. In such position, the wheels 50 are raised to non-supporting position above the bottom of the plate member 31, and the handle members 45 will be in a position close to and substantially parallel with their side flanges 32 and 33. The above operations are reversed to return the handles, wheels, etc. to use position.

I do not desire to limit myself to the specific details of construction, arrangement, and operation as herein set forth, as it is obvious that various modifications may be made therein without departing from the essential features of my invention, as defined in the appended claims.

I claim:

1. A portable loading dock plate comprising a rigid base plate member; a pair of axle shafts mounted respectively at the opposite sides of said base plate member, with the axis of each axle shaft angularly inclined toward the rear of said base plate member; a pair of projecting handle members provided at their inner ends with rigidly formed tubular bearings rotatably mounted on their respective axle shafts; wheel supporting hanger means connected to and projecting from each of said bearing members of said handle members, each said wheel supporting hanger means making an acute angle with the axis of its bearing member; and wheels rotatably mounted at the outer ends of said wheel supporting hanger means; whereby, when said handles are rotatably moved on their respective axle shafts to a position of non-use, said handles are positioned substantially parallel with the sides of said base plate member, with said wheels out of supporting contact with the floor, and when said handles are rotatably moved in the opposite direction on their axle shafts to a position of use, the outer ends of said handles are brought closer together to a position where they may be manually gripped advantageously by an operator, with said wheels substantially parallel and in supporting contact with said floor, and with said base plate member supported on said wheels.

2. A portable loading dock plate comprising a rigid base plate member; a pair of axle shafts mounted respectively at the opposite sides of said base plate member, with the axis of each axle shaft angularly inclined toward the rear of said base plate member; a pair of projecting handle members provided at their inner ends with rigidly formed tubular bearings rotatably mounted on their respective axle shafts; stop means on each of said handles adapted for engaging contact with said base plate member when said handle members are rotatably moved on their axle shafts to a position of use; wheel supporting hanger means connected to and projecting from each of said bearing members of said handle members, each said wheel supporting hanger means making an acute angle with the axis of its bearing member; and wheels rotatably mounted at the outer ends of said wheel supporting hanger means; whereby, when said handles are rotatably moved on their respective axle shafts to a position of non-use, said handles are positioned substantially parallel with the sides of said base plate member, with said wheels out of supporting contact with the floor, and when said handles are rotatably moved in the opposite direction on their axle shafts to a position of use, the outer ends of said handles are brought closer together to a position where they may be manually gripped advantageously by an operator, with said wheels substantially parallel and in supporting contact with said floor, and with said base plate member supported on said wheels.

3. A portable loading dock plate comprising a rigid base plate member; a pair of axle shafts mounted respectively at the opposite sides of said base plate member, with the axis of each axle shaft angularly inclined toward the rear of said base plate member; a pair of projecting handle members provided at their inner ends with rigidly formed tubular bearings rotatably mounted on their respective axle shafts; a pair of spaced apart wheel supporting hanger brackets connected to and projecting from the bearing members of each of the handle members, each said wheel supporting hanger means making an acute angle with the axis of its bearing member; aligned bearing openings formed at the outward ends of the pair of wheel supporting hanger brackets; a wheel axle journalled at its opposite ends in the aligned bearing openings in each pair of wheel supporting hanger brackets, the axis of the wheel axle converging in a direction toward said base plate member with the axis of the axle shaft of the bearing member of the handle member; and a wheel mounted on each of said wheel axles; whereby, when said handles are rotatably moved on their respective axle shafts to a position of non-use, said handles are positioned substantially parallel with the sides of said base plate member, with said wheels out of supporting contact with the floor, and when said handles are rotatably moved in the opposite direction on their axle shafts to a position of use, the outer ends of said handles are brought closer together to a position where they may be manually gripped advantageously by an operator, with said wheels substantially parallel and in supporting contact with said floor, and with said base plate member supported on said wheels.

References Cited in the file of this patent
UNITED STATES PATENTS

| | | |
|---|---|---|
| 1,667,267 | Pitcher | Apr. 24, 1928 |
| 1,717,358 | Adcock et al. | June 18, 1929 |
| 2,461,479 | Moffat | Feb. 8, 1949 |
| 2,597,213 | Whiteman | May 20, 1952 |
| 2,636,748 | Giovannoni | Apr. 28, 1953 |